(12) United States Patent
Thomas

(10) Patent No.: US 7,357,457 B2
(45) Date of Patent: Apr. 15, 2008

(54) VEHICLE WITH INTERCHANGEABLE TRUCK BED

(75) Inventor: Carey Jay Thomas, Fort Wayne, IN (US)

(73) Assignee: Thomas Quick Change, LLC, Fort Wayne, IN (US)

( * ) Notice: Subject to any disclaimer, the term of this patent is extended or adjusted under 35 U.S.C. 154(b) by 164 days.

(21) Appl. No.: 10/979,050

(22) Filed: Nov. 2, 2004

(65) Prior Publication Data
US 2006/0091718 A1 May 4, 2006

(51) Int. Cl.
*B60P 1/16* (2006.01)
(52) U.S. Cl. ............... 298/1 A; 298/17 R; 298/22 R; 410/80
(58) Field of Classification Search ............ 298/1 A, 298/17 R, 22 R, 17 T; 410/77, 80, 81, 90–91, 410/71, 76; 296/35.3; 280/DIG. 8, 418.1
See application file for complete search history.

(56) References Cited

U.S. PATENT DOCUMENTS

| | | | | |
|---|---|---|---|---|
| 1,675,701 A | * | 7/1928 | Fitch | 410/71 |
| 4,969,690 A | * | 11/1990 | Smith | 298/17 R |
| 6,390,742 B1 | * | 5/2002 | Breeden | 410/77 |

\* cited by examiner

*Primary Examiner*—Stephen Gordon
(74) *Attorney, Agent, or Firm*—Woodard Emhardt Moriarty McNett & Henry LLP

(57) ABSTRACT

A vehicle for use with a plurality of interchangeable truck beds, i.e., functional units. The vehicle includes a chassis and an engine and cab mounted on the chassis. The chassis extends rearwardly from the cab from a first location to a second location at the rear end of the chassis. A first mounting interface is disposed near the first location and a second mounting interface is disposed near the second location. The mounting interfaces each include a substantially horizontal support surface and a guide member. The interchangeable truck beds include mounting structures that are secured to the mounting interfaces on the chassis. The guide members on the mounting interfaces are used to properly position the mounting structures on the chassis. The truck bed may be a dump truck bed that includes a hydraulic ram having a base structure that is secured to the first mounting interface and a hinge structure that is secured to the second mounting interface.

13 Claims, 7 Drawing Sheets

VEHICLE WITH INTERCHANGEABLE TRUCK BED

BACKGROUND OF THE INVENTION

1. Field of the Invention

The present invention relates to a vehicle with an interchangeable truck bed and, more specifically, a vehicle that includes mounting interfaces that allow the vehicle to be used with a variety of different truck beds.

2. Description of the Related Art

Trucks that have a removable bed are known in the art. For example, various apparatus have been developed for use with the tractor of a conventional tractor-trailer combination. Such tractors typically have a front steerable axle, two rear axles and a fifth wheel for attaching a trailer to the tractor. The design of fifth wheels has been standardized to allow such tractors to work with cargo trailers having a standard design. The fifth wheel includes a large metal plate mounted to the tractor chassis that typically includes a slot opening toward the rear of the tractor to receive the king pin of the trailer. The fifth wheel provides a support surface for the trailer, locks the king pin in place and provides for the rotation of the trailer relative to the tractor.

Various truck beds have been designed that can be mounted over the fifth wheel of such a tractor. These truck beds, however, can be awkward to mount and remove from the tractor. Moreover, these trailers do not have the same capacity as a tri-axle truck body, i.e., a truck having a front steerable axle and three rear axles, that are often equipped with dump beds for hauling earth and other heavy loads.

The removal of the bed of a tri-axle dump truck is also known. However, the removal of such a bed is typically quite labor intensive because of the hinge that is used to attach the bed to the chassis of the vehicle. Typically, a first pair of hinge knuckles is fixed to the bed itself while a second pair of hinge knuckles is fixed to the chassis of the vehicle. Hinge pins connect the two pair of knuckles together to provide a hinged attachment of the bed to the chassis. The bed will also include a hydraulic ram that has a base attached to the vehicle chassis. The removal of the bed requires that the hinge pins be removed as well as the detachment of the hydraulic ram base. The removal of the hinge pins, and subsequent reinsertion when installing a dump bed on the triaxle truck body, can be difficult and quite time consuming, i.e., several hours or more.

It may be desirable to change the bed of such a truck to replace it with a different type of bed, e.g., a flat bed, water tank or fifth wheel, so that the truck can be used to perform additional functions and thereby minimize the capital expenditures to achieve a given range of functionality. At other times it will also be necessary to replace the bed with a similar bed because the original bed has been damaged. The significant amount of time required to remove one bed from the truck and install a new bed, whether having the same or different function, on the truck removes the truck from service for a significant amount of time leading to increased labor costs as well as lost revenue.

A vehicle system that allows a truck to have its bed relatively easily and quickly removed and replaced is desirable.

SUMMARY OF THE INVENTION

The present invention provides vehicle having mounting interfaces that allow the bed attached to the vehicle to be relatively easily and quickly interchanged with another bed or functional unit.

The invention comprises, in one form thereof, a vehicle for use with a plurality of different functional units. The vehicle includes a chassis, an engine mounted on the chassis and a cab mounted on the chassis. The chassis extends rearwardly from the cab from a first location adjacent the cab to a second location defining a rear end of the chassis. A first mounting interface is disposed on the chassis proximate the first location and includes a substantially horizontal support surface and a first guide member. A second mounting interface is disposed on the chassis proximate the second location and includes a substantially horizontal support surface and a second guide member. The plurality of functional units are mountable on the vehicle by supportably engaging the functional unit with the first and second mounting interfaces. The functional units are positioned on the first and second mounting interfaces by engagement with the first and second guide members.

The invention comprises, in yet another form thereof, a vehicle conversion system. The system includes a vehicle including a chassis, an engine mounted on the chassis and a cab mounted on the chassis. The chassis extends rearwardly from the cab from a first location adjacent the cab to a second location defining a rear end of the chassis. A first mounting interface is disposed on the chassis proximate the first location and includes a substantially horizontal support surface and a first guide member. A second mounting interface is disposed on the chassis proximate the second location and includes a substantially horizontal support surface and a second guide member. A plurality of functional units are securable to the vehicle. Each of the functional units includes a first mounting structure and a second mounting structure. Each of the first mounting structures are engagable with the first mounting interface and are positioned on the first mounting interface in a predefined location by engagement of the first mounting structure with the first guide member. Each of the second mounting structures are engageable with the second mounting interface and are positioned on the second mounting interface in a predefined location by engagement of the second mounting structure with the second guide member.

The invention comprises, in yet another form thereof, a dump truck that includes a vehicle body having a chassis, an engine mounted on the chassis and a cab. A first mounting interface and a second mounting interface are disposed on the chassis. Also included is a removable bed that includes a bed structure, a hydraulic ram and a hinge structure. The hydraulic ram has a base structure removably securable to the first mounting interface. The hinge structure includes at least one first hinge knuckle fixed to the bed structure, at least one second hinge knuckle pivotally secured to the first hinge knuckle and a mounting plate. The second hinge knuckle is fixed to the mounting plate and the mounting plate is removably securable to the second mounting interface.

The invention comprises, in still another form thereof, a method of interchanging a bed on a dump truck. The method includes providing a vehicle having a chassis and providing the chassis with a first mounting interface and a second mounting interface. A truck bed is provided and includes a hydraulic ram having a base structure. The truck bed is provided with a hinge structure wherein the hinge structure includes at least one first knuckle fixed to the truck bed, at least one second knuckle pivotally secured to the first knuckle, and a mounting plate fixed to the at least one second knuckle. The truck bed is removably secured to the vehicle by removably securing the base structure of the hydraulic ram to the first mounting interface and removably securing the mounting plate to the second mounting interface.

An advantage of the present invention is that it provides a vehicle which can be relatively quickly converted from a dump truck to a vehicle having another function such as a water truck, flat bed truck or a tractor for towing a cargo trailer.

Another advantage is that by providing a dump truck bed having a hinge structure that can be removed from the vehicle in its entirety, the hinge structure does not have to be disassembled when removing the bed thereby saving a considerable amount of time when installing or removing the dump truck bed.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Figure 1:
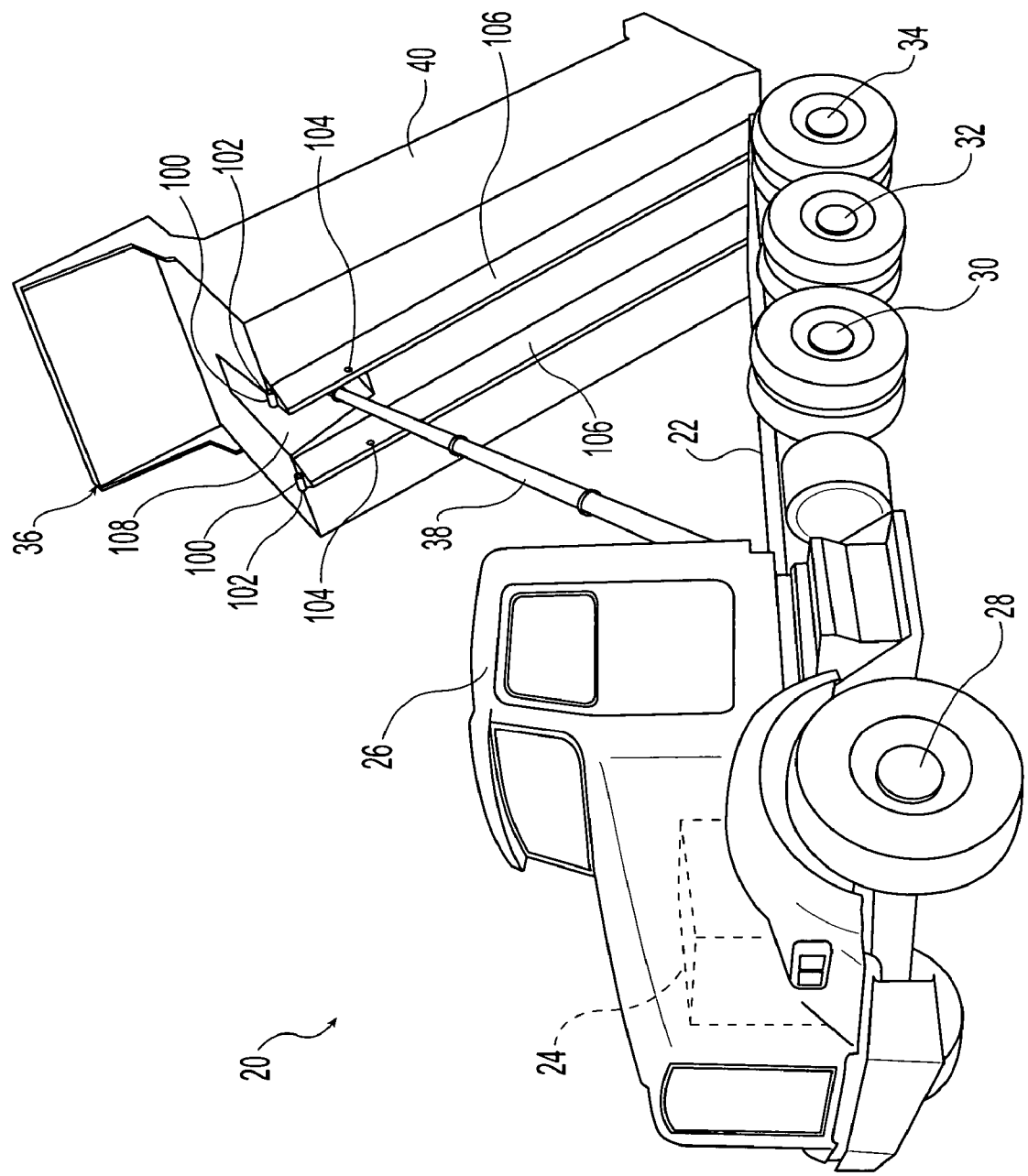
FIG. 1 is a front perspective view of a vehicle in accordance with the present invention.

Corresponding reference characters indicate corresponding parts throughout the several views. Although the exemplification set out herein illustrates an embodiment of the invention, in one, the embodiment disclosed below is not intended to be exhaustive or to be construed as limiting the scope of the invention to the precise form disclosed.

DETAILED DESCRIPTION OF THE INVENTION

FIG. 1 illustrates a vehicle 20 in accordance with the present invention. Vehicle 20 includes a chassis 22 on which an engine 24 and cab 26 are mounted. The illustrated vehicle 20 is a triaxle truck having a front steerable axis 28 and three rear axles 30, 32, 34. Vehicle 20 has a generally conventional construction except for the manner in which it has been adapted to provide for the interchangeability of truck beds, or functional units, on the vehicle. As used herein, the term "functional unit" is used interchangeably with truck bed and refers to any apparatus that can be removably attached to vehicle 20 regardless of whether or not it has a "bed".

Figure 2:
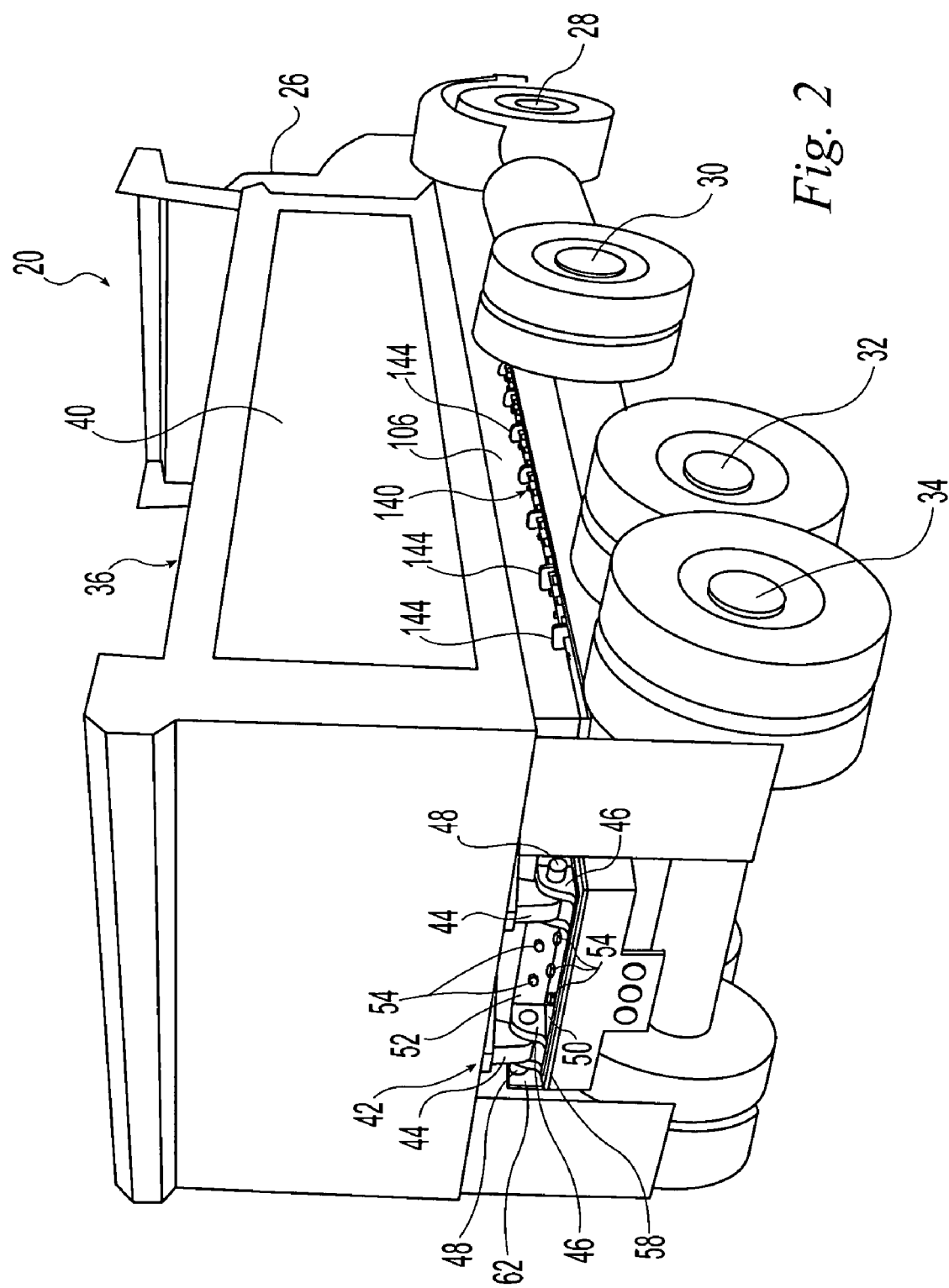
FIG. 2 is a rear perspective view of the vehicle of FIG. 1.

FIGS. 1 and 2 illustrate vehicle 20 with a dump truck bed 36 attached to chassis 22. Dump bed 36 is shown in its raised position in FIG. 1, while FIG. 2 illustrates dump bed 36 in its lowered position. As best seen in FIG. 1, dump bed 36 includes a telescoping hydraulic ram 38 to lift one end of the bed structure 40. Bed structure 40 pivots about hinge structure 42 located at the rear end of bed structure 40 and best seen in FIG. 2. Hinge structure 42 includes a pair of first hinge knuckles 44 that are fixed to bed structure 40 by welding. A second set of hinge knuckles 46 are positioned on opposite sides of each first knuckle 44 and are pivotally connected thereto by hinge pins 48. The second set of hinge knuckles 46 are welded to mounting plates 50 and 52. Mounting plates 50 and 52 form an L-shaped bracket with plate 50 being positioned horizontally and plate 52 being positioned vertically. Bolts 54 secure plates 50 and 52 to mounting interface 56 on chassis 22.

Figure 5:
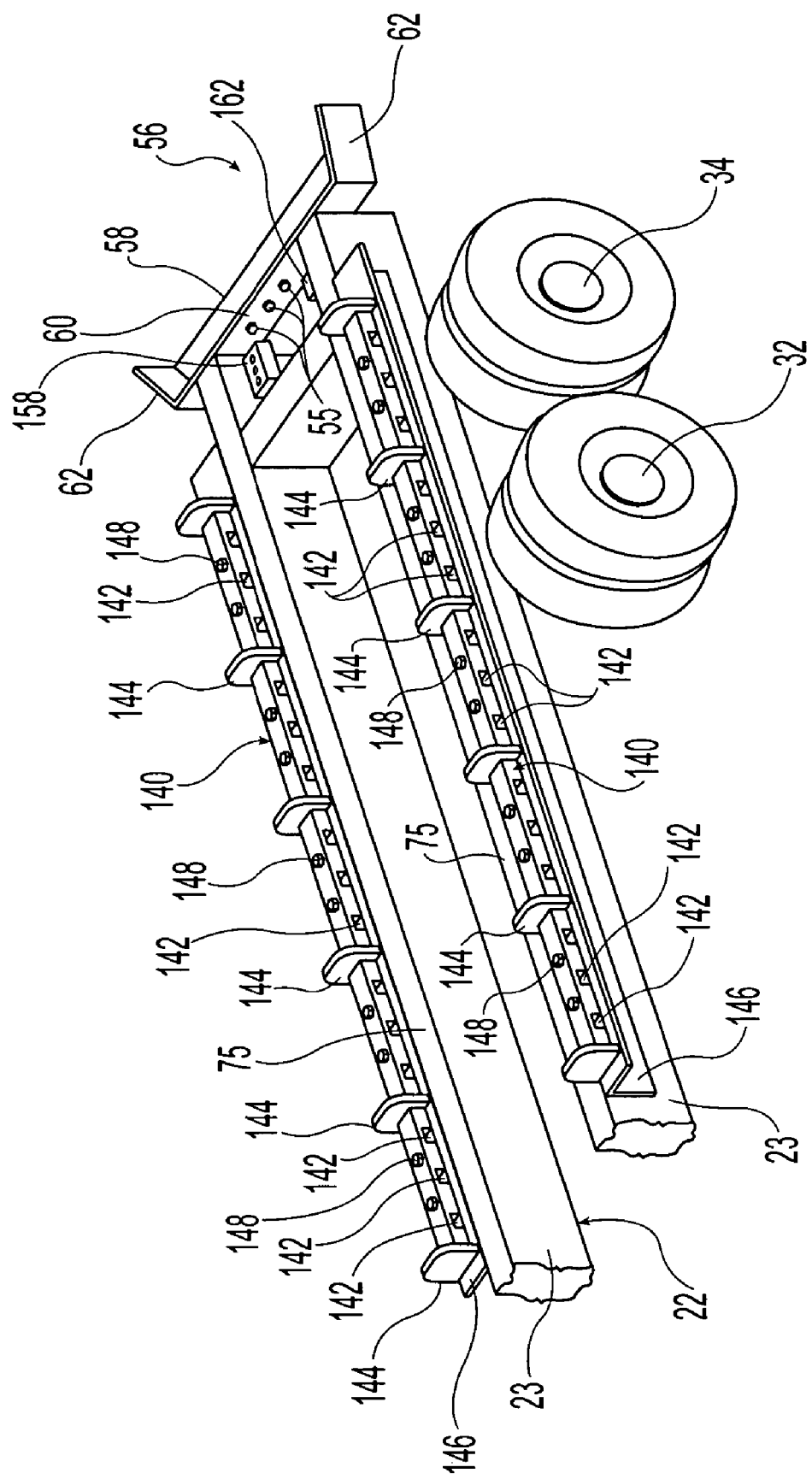
FIG. 5 is a perspective view of the rear section of the chassis and a fifth wheel, a water tank unit and a flat bed unit.

Mounting interface 56 is best seen in FIG. 5 and includes a horizontal support surface 58 and guide walls 60, 62 which are all formed of steel plate. Mounting plates 50, 52 have a lateral width that is substantially equal to that of back guide wall 60 and, as seen in FIG. 5, sidewalls 62 are flared outwardly. When bed 36 is mounted on vehicle 20, bed 36 will be in a hanger structure and vehicle 20 will be backed up to engage bed with vehicle 20. As vehicle 20 is being backed into engagement with bed 36, the laterally outwardly flared configuration of sidewalls 62 will help to guide and center mounting plates 50, 52 within mounting interface 56. Once mounting plate 52 is flush against the surface of back wall 60 and mounting plate 50 is properly positioned on support surface 58, bolts 54 are used to secure plates 50, 52 to chassis 22. Openings extend through back wall 60 and the bottom plate forming support surface 58 to receive bolts 54. Nuts 55 are welded onto the opposite side of back wall 60 and the bottom plate at the location of these openings to engage and secure bolts 54.

By detachably securing hinge structure 42 to chassis 22 at mounting plates 50, 52, pivot pins 48 do not have to be removed or inserted when removing or installing bed 36 thereby greatly simplifying the process of attaching and removing bed 36. Furthermore, by removing hinge knuckles 48 with bed 36, mounting interface 56 can more easily receive a mounting structure for a different functional unit.

Figure 4:
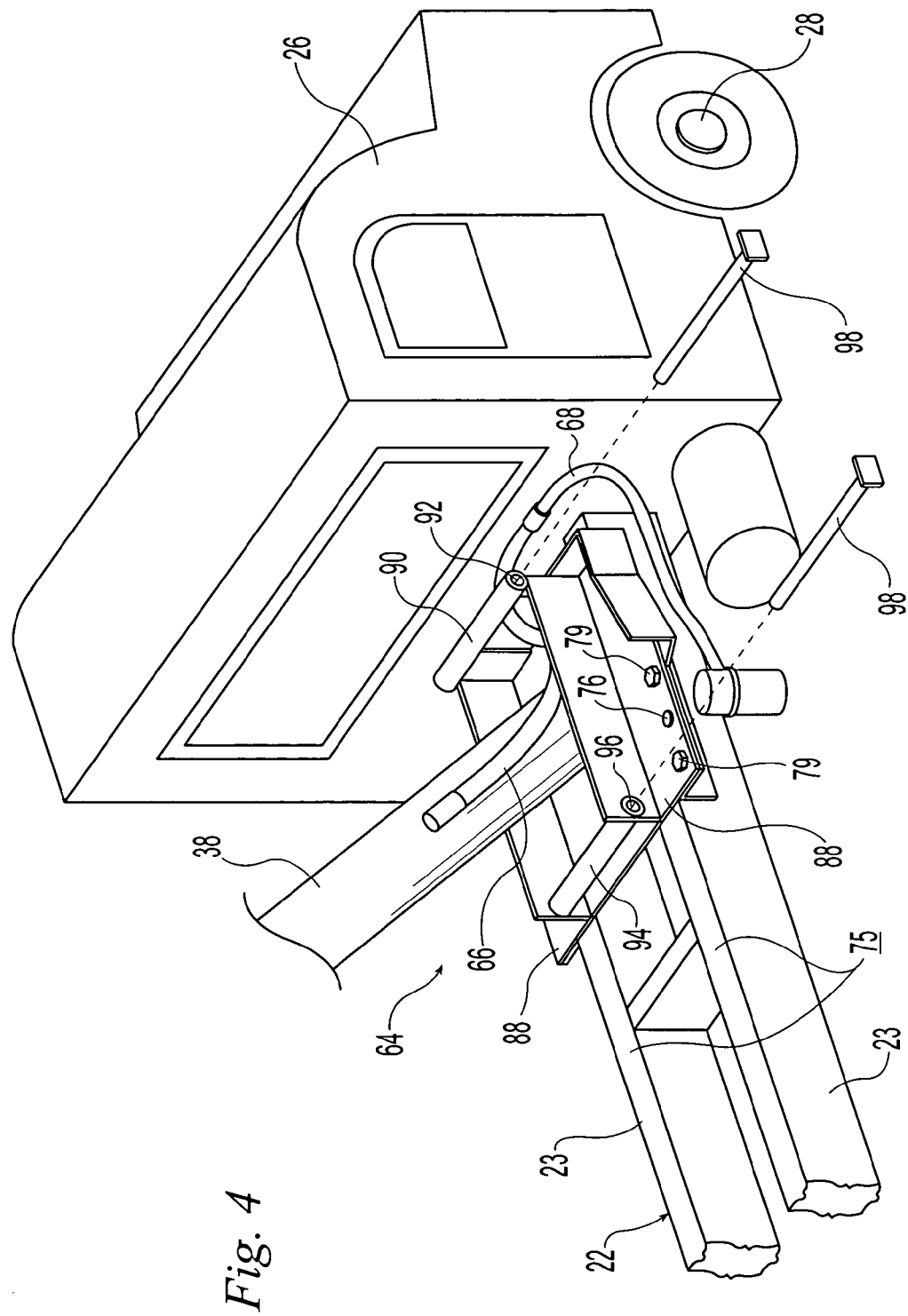
FIG. 4 is a schematic perspective view of the vehicle of FIG. 1 showing the base structure of a hydraulic ram secured to the first mounting interface.

When mounting, or removing, bed 36 from vehicle 20, hydraulic ram 38 must also be secured to chassis 22. FIG. 4 illustrates the base structure 64 of hydraulic ram 38 attached to chassis 22 at mounting interface 70. A hydraulic line 66 mounted to ram 38 is coupled to the hydraulic system 68 of vehicle 20. Hydraulic system 68 is typical of hydraulic systems found on triaxle trucks and provides pressurized hydraulic fluid to operate ram 38 or other hydraulic device attached thereto.

Figure 3:
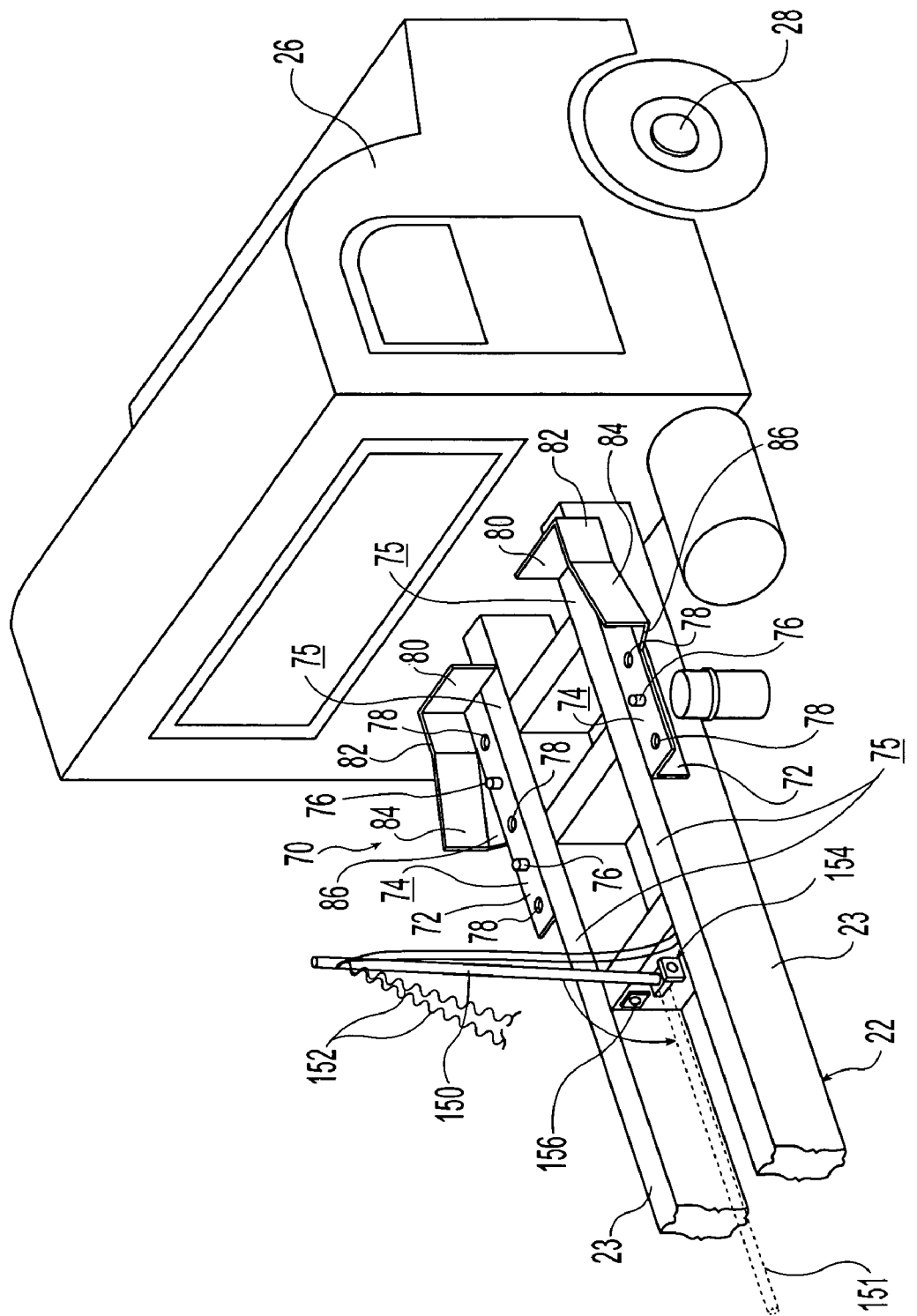
FIG. 3 is a schematic perspective view of the vehicle of FIG. 1 showing a first mounting interface.

Mounting interface 70 is best seen in FIG. 3 and includes L-brackets fixed to outer lateral side of longitudinally extending parallel structural rails 23. Rails 23 are the major longitudinal elements of chassis 22. The upper horizontal surface 74 of L-brackets 72 forms a support surface and has guide pins 76 extending upwardly therefrom. Nuts (not shown) are welded below openings 78 in L-brackets 72 to engage bolts 79 when detachably securing hydraulic ram base structure 64 to vehicle 20.

Mounting interface 70 also includes guide walls 80, 82. Back walls 80 are located longitudinally forward of mounting interface 70 and provide a longitudinal stop for base structure 64 when mounting bed 36 on vehicle 20. Sidewalls 82 are located on opposite lateral sides of mounting interface 70 and include outwardly flared portions 82 at the rear longitudinal ends sidewalls 80. Flared portions 82 laterally position base structure 64 during the mounting of bed 36 on vehicle 20 similar to the manner in which sidewalls 62 function as described above. A pie piece shaped metal plate 86 is welded between L-brackets 72 and flared portions 82 to brace flared sidewall portions 82.

FIG. 4 illustrates base structure 64 attached to mounting interface 70. The horizontal support surface on which base structure 64 rests is formed by both surface 74 on L-brackets 72 and upper surface 75 on structural rails 23. Base structure 64 includes a bottom plate 88 that has openings which are seated on guide pins 76 to ensure the proper positioning of base structure 64. Bottom plate 88 also includes openings through which bolts 79 are inserted to detachably secure base structure 64. Base structure 64 also includes a tube 90 located near the longitudinal front of base 64 defining an aperture 92 and a second tube 94 near the longitudinal rear of base 64 defining an aperture 96. As seen in FIG. 1, bed structure 40 has tubes 100 mounted at its front end on opposite sides of void space 108. Tubes 100 define axially aligned openings 102. Support beams 106 on the underside of bed structure 40 define aligned openings 104. When bed structure 40 is lowered, base structure 64 is located within void space 108. When removing bed 36, bed structure 40 is lowered and rods 98 are used to secure base structure 64 within void space 108. When bed structure 40 is lowered, tube 90 will be positioned between and aligned with tubes 100 to receive one of the rods 98 while tube 94 will be positioned between and aligned with openings 104 to receive the other rod 98.

In addition to dump bed 36, a water tank unit 110, flat bed unit 126 and other units having alternative functions can be readily attached to vehicle 20. The attachment of such units to vehicle 20 is facilitated by the configuration of first mounting interface 70 and second mounting interface 56 which can accept mounting structures having a relatively simple design.

Figure 6:
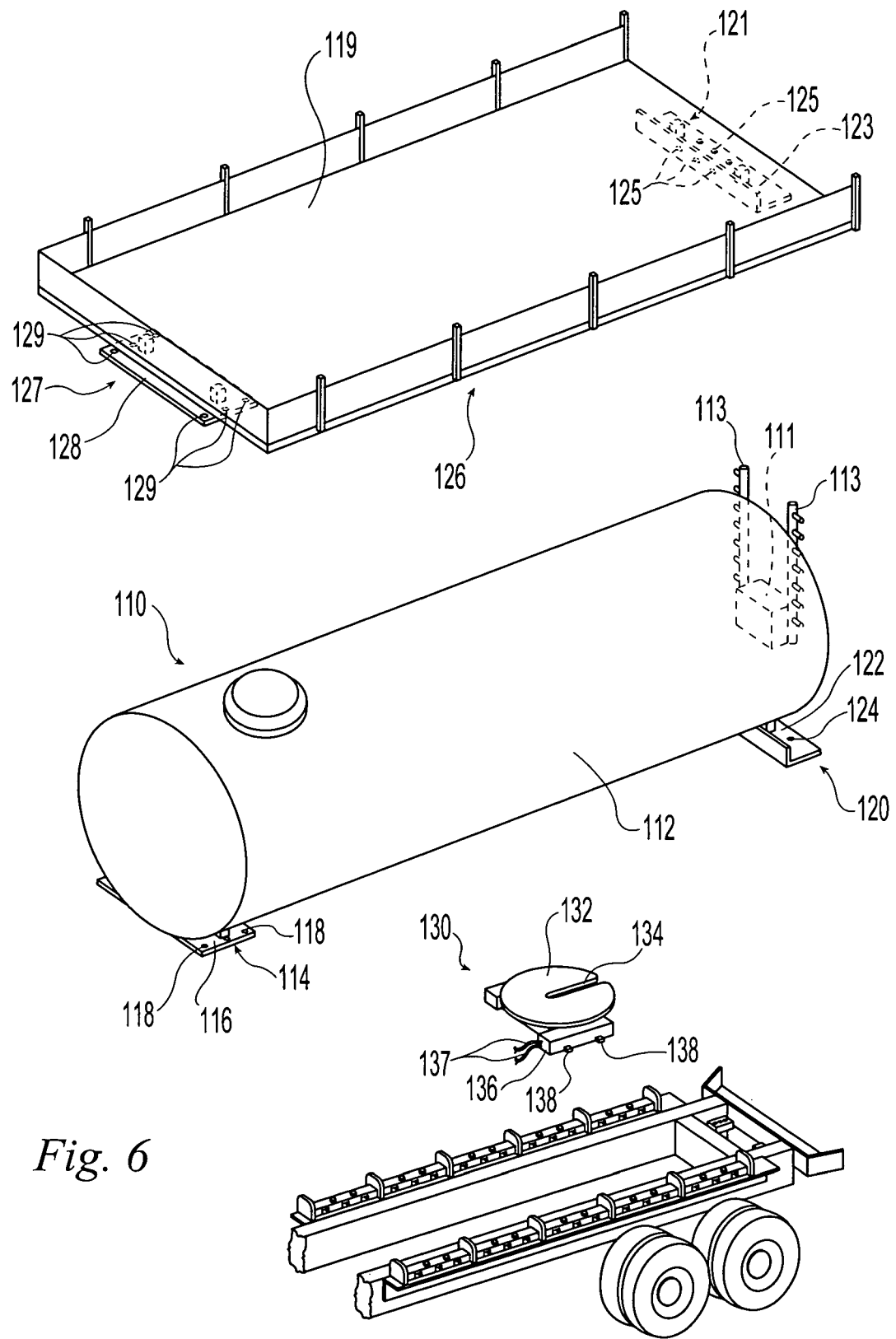
FIG. 6 is an exploded schematic perspective view of the rear section of the chassis with FIG. 7 is a schematic perspective view of the rear section of the chassis with a hinged dump bed attached thereto.
Figure 7:
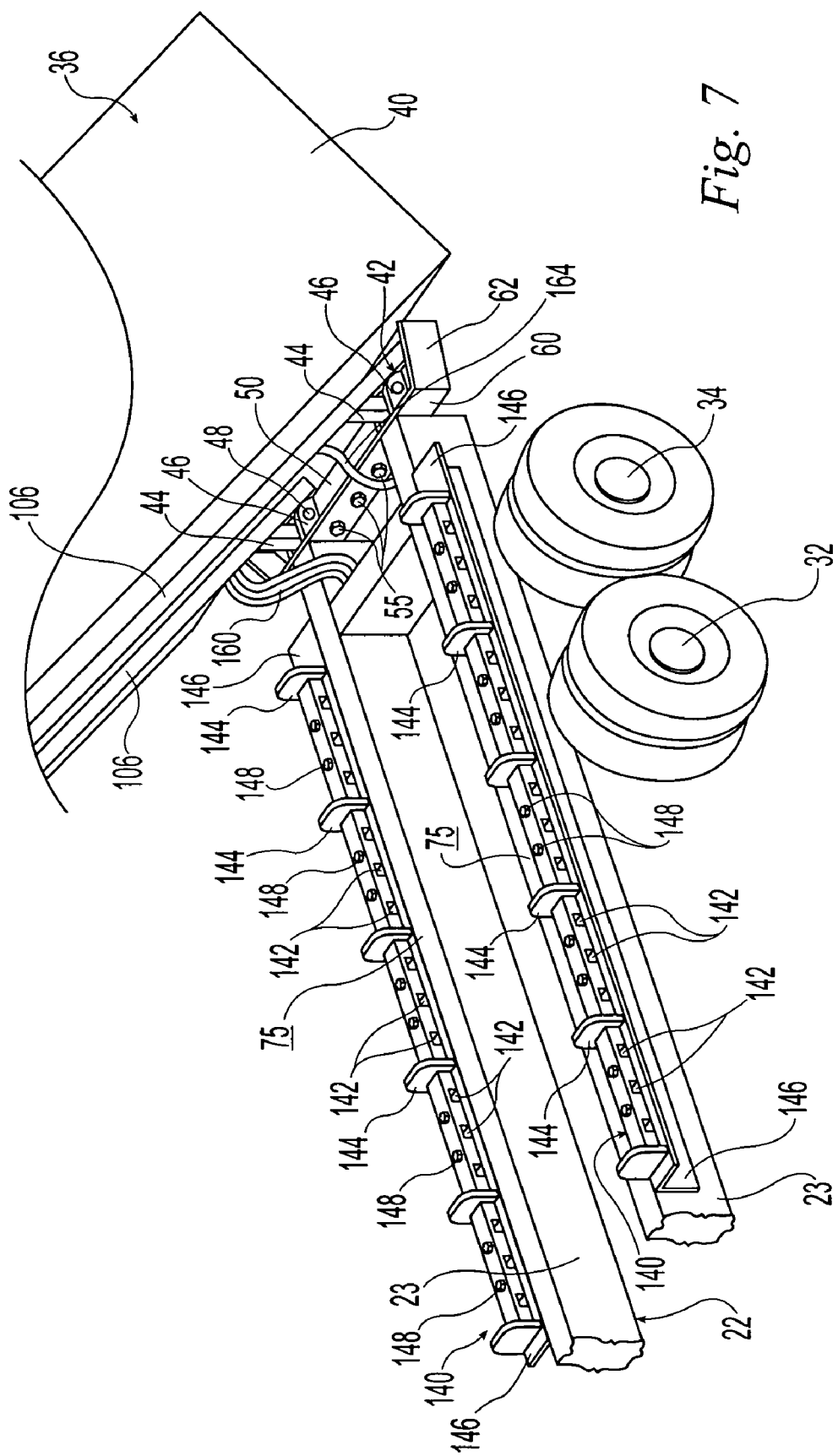

As shown in FIG. 6 water tank unit 110 includes a water tank 112 that has a first mounting structure 114 located at its front end and a second mounting structure 120 at its rear end. First mounting structure includes a steel plate 116 that can be seated on mounting interface 70 and defines openings 118 that correspond to guide pins 76 and openings 78 on first mounting interface 70. Second mounting structure 120 includes metal plates 122 joined in an L-shaped configuration similar to that of mounting plates 50, 52 located on bed 36. Plates 122 include openings 124 that correspond to openings located in second mounting interface 56 whereby bolts secured to nuts 55 are used to secure second mounting structure 120 onto mounting interface 56. Water tank 112 has a pump 111 mounted on its rear together with pivoting spray arms 113. Pump 111 is hydraulically powered and, when tank 112 is mounted on vehicle 20, pump 111 is connected to hydraulic system 68 of vehicle 20 to power pump 111.

Flat bed unit 126 includes a truck bed 119, a first mounting structure 127 and a second mounting structure 121. First and second mounting structures 127 and 121 on flat bed unit 126 have a configuration similar to first and second mounting structures 114, 120 on water tank unit 110 and are attachable to first and second mounting interfaces 70, 56 respectively. More specifically, first mounting structure 127 includes a steel plate 128 that is guided into position on first mounting interface 70 by guide walls 80, 82 and has openings 129 that correspond to guide pins 76 and bolt openings 78. Similarly, second mounting structure 121 includes metal plates 123 having an L-shaped configuration and a lateral width substantially equivalent to back wall 60 so that metal plates 123 are guided into position by guide walls 60, 62 when mounting flat bed unit 126 to vehicle 20. Metal plates 122 also include openings 125 that correspond to openings in horizontal plate 58 and back wall 60 to thereby receive bolts for securing mounting structure 121 to vehicle 20.

As described above with reference to dump bed 36, when mounting water tank unit 110 or flat bed unit 126 to vehicle 20, flared sidewalls 82, 62 direct first mounting structures 114, 127 and second mounting structures 120, 121 respectively into a predefined lateral position and engagement with back walls 80, 60 longitudinally positions the first and second mounting structures. Furthermore, insertion of guide pins 76 through openings 118, 129 in first mounting structures 114, 127, also ensures the proper positioning of units 110, 126 on chassis 22. Alternative configurations, however, using guide walls alone, guide pins alone, or some other configuration of guide members to laterally and/or longitudinally position the mounting structures on chassis 22 may also be employed with the present invention.

A fifth wheel 130 (FIG. 6) can also be mounted on chassis 22. Fifth wheel 130 includes a conventional tilting and pivotal plate 132 having a slot 134 in which the king pin of a cargo trailer can be locked. Plate 132 is mounted on a base structure 136 that rests on the upper surface 75 of structural rails 23 when fifth wheel 130 is mounted on chassis 22. Fifth wheel assembly 130 can be placed on and removed from chassis 22 using a fork lift. Located on the outer lateral sides of structural rails 23 are two elongate mounting rails 140 that extend parallel to longitudinally extending structural rails 23.

Mounting rails 140 are mounted opposite one another and adjacent to upper surface 75 of structural rails 23 on L-shaped brackets 46 attached to the outer lateral sides of structural rails 23. Each of the mounting rails 140 include a plurality of longitudinally spaced openings 142 for receiving retractable locking members 138 on fifth wheel 130. Two locking members 138 extend from each side of fifth wheel assembly 130. The plurality of openings 142 on mounting rails allow fifth wheel 130 to be mounted at any one of several different longitudinal positions on chassis 22. In the illustrated embodiment, electrical lines 139 are in communication with solenoids that actuate locking members 138. Alternative embodiments, however, could employ manually actuated locking members (e.g., nuts and bolts) or use a hydraulic actuated locking member or other suitable method for securely engaging fifth wheel base 136 with mounting rails 140.

Mounting rails 140 are secured to L-brackets 146 with bolts 148. Other suitable means for attaching mounting rails 140, such as welding, may also be employed. Mounting rails 140 also include several longitudinally spaced ribs 144. These ribs 144 help to maintain truck bed components centered on structural rails 23 and protect mounting rails 140 from damage from the other truck beds that can be attached to chassis 22. For example, ribs 44 help to guide support beams 106 on the lower surface of dump bed 36 onto upper surfaces 75 of structural rails 23 as can be seen in FIG. 2.

When secured, fifth wheel is positioned longitudinally between the first and second mounting interfaces 70, 56 and laterally between the mounting rails 140. A utility post 150, commonly referred to as a pogo stick, is mounted on chassis 22 laterally forward of mounting rails 140 for use with a cargo trailer attached to fifth wheel 130. Utility post 150 is pivotally secured to chassis with pivot assembly 154 located laterally between structural rails 23 and longitudinally between first mounting interface 70 and mounting brackets 140 so that post 150 can be positioned in its upright orientation shown in FIG. 3 when fifth wheel 130 is secured to mounting rails 140 and a cargo trailer is attached to fifth wheel 130. When not being used, such as when dump bed 36 is attached to chassis 22, post 150 and attached utility lines 152 are pivoted downward below the upper surface 75 of structural rails 23 to the position indicated by dashed lines 151 in FIG. 3. Utility lines 152 are conventional compressed air lines that can be coupled with a cargo trailer attached to fifth wheel 130. An electrical box 156 with pivoting cover is provided proximate utility post 150 to provide electrical power to a cargo trailer attached to fifth wheel 130.

As best seen in FIGS. 5 and 6, vehicle 20 also includes standardized electrical sockets 158 near the rear longitudinal end of chassis 22 which can be connected to electrical lines 160 for controlling the operation of brake lights, turn signals etc. located on truck bed 36 or other functional unit attached to vehicle 20. An electrical box 162 is also provided on chassis 22 near the longitudinal rear of chassis 22 to provide electrical power via electrical line 164 to truck bed 36 or other functional unit attached to vehicle 20.

While this invention has been described as having an exemplary design, the present invention may be further modified within the spirit and scope of this disclosure. This application is therefore intended to cover any variations, uses, or adaptations of the invention using its general principles.

What is claimed is:

1. A vehicle for use with a plurality of different functional units, said vehicle comprising:

a chassis;

an engine mounted on said chassis;

a cab mounted on said chassis, said chassis extending rearwardly from said cab from a first location adjacent said cab to a second location defining a rear end of said chassis;

a first mounting interface disposed on said chassis proximate said first location, said first mounting interface including a substantially horizontal support surface and a first guide member; and a second mounting interface disposed on said chassis proximate said second location, said second mounting interface including a substantially horizontal support surface and a second guide member, wherein any one of a plurality of functional units is mountable on said vehicle by supportably engaging the functional unit with said first and second mounting interfaces and wherein the functional unit is positioned on said first and second mounting interfaces by engagement with said first and second guide members;

wherein said chassis includes two parallel structural rails extending between said first and second locations and wherein said vehicle further comprises first and second elongate mounting rails, said first and second mounting rails extending parallel to said structural rails and disposed opposite one another laterally outwardly adjacent said structural rails wherein said first and second mounting rails are adapted to secure a fifth wheel on said structural rails longitudinally between said first and second locations and laterally between said first and second mounting rails;

and further comprising first and second L-brackets, said first L-bracket secured to a laterally outward side of one of said structural rails and said second L-bracket secured to a laterally outward side of the other of said structural rails, said first mounting rail being secured to said first L-bracket, said second mounting rail being secured to said second L-bracket.

2. A vehicle conversion system, said system comprising: a vehicle, said vehicle including: a chassis; an engine mounted on said chassis; a cab mounted on said chassis, said chassis extending rearwardly from said cab from a first location adjacent said cab to a second location defining a rear end of said chassis; a first mounting interface disposed on said chassis proximate said first location, said first mounting interface including a substantially horizontal support surface and a first guide member; second mounting interface disposed on said chassis proximate said second location, said second mounting interface including a substantially horizontal support surface and a second guide member; and a plurality of functional units securable to said vehicle, each of said functional units including a first mounting structure and a second mounting structure, each of said first mounting structures being engagable with said first mounting interface and being positionable on said first mounting interface in a predefined position by engagement of said first mounting structure with said first guide member; each of said second mounting structures being engageable with said second mounting interface and being positionable on said second mounting interface in a predefined position by engagement of said second mounting structure with said second guide member;

wherein said chassis includes two parallel structural rails extending between said first and second locations and wherein said vehicle further comprises first and second elongate mounting rails, said first and second mounting rails extending parallel to said structural rails and disposed opposite one another laterally outwardly adjacent said structural rails; and a fifth wheel assembly mountable on said chassis longitudinally between said first and second locations and laterally between said first and second mounting rails, said fifth wheel being secured to said chassis by engagement with said first and second mounting rails;

wherein said first and second mounting rails each include a plurality of longitudinally spaced openings, said fifth wheel assembly including at least one locking member engageable with one of said spaced openings on each of said first and second mounting rails to thereby secure said fifth wheel assembly on said chassis at a selected one of a plurality of different longitudinal positions.

3. A vehicle conversion system, said system comprising: a vehicle, said vehicle including: a chassis; an engine mounted on said chassis; a cab mounted on said chassis, said chassis extending rearwardly from said cab from a first location adjacent said cab to a second location defining a rear end of said chassis; a first mounting interface disposed on said chassis proximate said first location, said first mounting interface including a substantially horizontal support surface and a first guide member; second mounting interface disposed on said chassis proximate said second location, said second mounting interface including a substantially horizontal support surface and a second guide member; and a plurality of functional units securable to said vehicle, each of said functional units including a first mounting structure and a second mounting structure, each of said first mounting structures being engagable with said first mounting interface and being positionable on said first mounting interface in a predefined position by engagement of said first mounting structure with said first guide member; each of said second mounting structures being engageable with said second mounting interface and being positionable on said second mounting interface in a predefined position by engagement of said second mounting structure with said second guide member;

wherein said chassis includes two parallel structural rails extending between said first and second locations and wherein said vehicle further comprises first and second elongate mounting rails, said first and second mounting rails extending parallel to said structural rails and disposed opposite one another laterally outwardly adjacent said structural rails; and a fifth wheel assembly mountable on said chassis longitudinally between said first and second locations and laterally between said first and second mounting rails, said fifth wheel being secured to said chassis by engagement with said first and second mounting rails;

and further comprising first and second L-brackets, said first L-bracket secured to a laterally outward side of one of said structural rails and said second L-bracket secured to a laterally outward side of the other of said structural rails, said first mounting rail being secured to said first L-bracket, said second mounting rail being secured to said second L-bracket.

4. A vehicle conversion system, said system comprising: a vehicle, said vehicle including: a chassis; an engine mounted on said chassis; a cab mounted on said chassis, said chassis extending rearwardly from said cab from a first location adjacent said cab to a second location defining a rear end of said chassis; a first mounting interface disposed on said chassis proximate said first location, said first mounting interface including a substantially horizontal support surface and a first guide member; second mounting interface disposed on said chassis proximate said second location, said second mounting interface including a substantially horizontal support surface and a second guide member; and a plurality of functional units securable to said vehicle, each of said functional units including a first mounting structure and a second mounting structure, each of said first mounting structures being engagable with said first mounting interface and being positionable on said first mounting interface in a predefined position by engagement of said first mounting structure with said first guide member; each of said second mounting structures being engageable with said second mounting interface and being positionable on said second mounting interface in a predefined position by engagement of said second mounting structure with said second guide member;

wherein said plurality of functional units includes a tiltable truck bed;

wherein said tiltable truck bed includes a bed structure and a hydraulic ram, a base of said hydraulic ram defining said first mounting structure and being engageable with said first mounting interface, said tiltable truck bed further comprising a hinge structure defining said second mounting structure and being engageable with said second mounting interface;

wherein said base of said hydraulic ram defines first and second apertures and said base is securable to said bed structure with first and second rods inserted through openings defined by said bed structure and through said first and second apertures respectively when removing and attaching said tiltable truck bed to said vehicle.

5. A vehicle conversion system, said system comprising: a vehicle, said vehicle including: a chassis; an engine mounted on said chassis; a cab mounted on said chassis, said chassis extending rearwardly from said cab from a first location adjacent said cab to a second location defining a rear end of said chassis; a first mounting interface disposed on said chassis proximate said first location, said first mounting interface including a substantially horizontal support surface and a first guide member; second mounting interface disposed on said chassis proximate said second location, said second mounting interface including a substantially horizontal support surface and a second guide member; and a plurality of functional units securable to said vehicle, each of said functional units including a first mounting structure and a second mounting structure, each of said first mounting structures being engagable with said first mounting interface and being positionable on said first mounting interface in a predefined position by engagement of said first mounting structure with said first guide member; each of said second mounting structures being engageable with said second mounting interface and being positionable on said second mounting interface in a predefined position by engagement of said second mounting structure with said second guide member;

wherein said plurality of functional units includes a tiltable truck bed;

wherein said tiltable truck bed includes a bed structure and a hydraulic ram, a base of said hydraulic ram defining said first mounting structure and being engageable with said first mounting interface, said tiltable truck bed further comprising a hinge structure defining said second mounting structure and being engageable with said second mounting interface;

wherein said hinge structure includes a first hinge knuckle fixed relative to said bed structure and a second hinge knuckle pivotal relative to said first hinge knuckle, said second hinge knuckle being fixed to a mounting plate, said mounting plate being detachably engageable with said substantially horizontal support surface of said second mounting interface.

6. A dump truck comprising: a vehicle body having a chassis, an engine mounted on said chassis and a cab; a first mounting interface disposed on said chassis; a second mounting interface disposed on said chassis; a removable dump bed, said removable dump bed including: a bed structure; a hydraulic ram having a base structure removably securable to said first mounting interface; a hinge structure, said hinge structure including at least one first hinge knuckle fixed to said bed structure, at least one second hinge knuckle pivotally secured to said first hinge knuckle and a mounting plate, said second hinge knuckle being fixed to said mounting plate, said mounting plate being removably securable to said second mounting interface;

wherein said chassis includes two parallel structural rails extending between first and second locations and wherein said vehicle further comprises first and second elongate mounting rails, said first and second mounting rails extending parallel to said structural rails and disposed opposite one another laterally outwardly adjacent said structural rails wherein said first and second mounting rails are adapted to secure a fifth wheel on said structural rails longitudinally between said first and second locations and laterally between said first and second mounting rails;

and further comprising first and second L-brackets, said first L-bracket secured to a laterally outward side of one of said structural rails and said second L-bracket secured to a laterally outward side of the other of said structural rails, said first mounting rail being secured to said first L-bracket, said second mounting rail being secured to said second L-bracket.

7. The dump truck of claim 6 wherein said base structure of said hydraulic ram defines first and second apertures and said base structure is securable to said bed structure with first and second rods inserted through openings defined by said bed structure and through said first and second apertures respectively when removing and installing said removable bed on said vehicle body.

8. The dump truck of claim 6 wherein said first mounting interface includes a first guide member, engagement of said first guide member with said base structure positioning said base structure in a predefined location on said first mounting interface; and wherein said second mounting interface includes a second guide member, engagement of said second guide member with said mounting plate positioning said mounting plate in a predefined location on said second mounting interface.

9. The dump truck of claim 8 wherein said first and second mounting interfaces each include a substantially horizontal support surface and at least one of said first and second guide members is a vertically extending member projecting from one of said substantially horizontal support surfaces.

10. The dump truck of claim 8 wherein said first and second mounting interfaces each include a substantially horizontal support surface and at least one of said first and second guide members is a planar surface disposed substantially perpendicular to one of said substantially horizontal support surfaces.

11. The dump truck of claim 10 wherein said first and second guide members comprise a back wall disposed longitudinally forward of said support surfaces and sidewalls disposed on opposite lateral sides of said support surfaces.

12. The dump truck of claim 11 wherein said sidewalls each define an outwardly flared portion at a rear longitudinal end of said sidewalls.

13. The dump truck of claim 8 wherein said first and second mounting interfaces each include a substantially horizontal support surface and each of said support surfaces includes a plurality of openings for receiving a bolt to detachably secure said bed structure to said chassis.

* * * * *